June 23, 1942. W. W. TURNBULL 2,287,206
MULTIPLE CONE DISPENSER
Filed Aug. 26, 1940
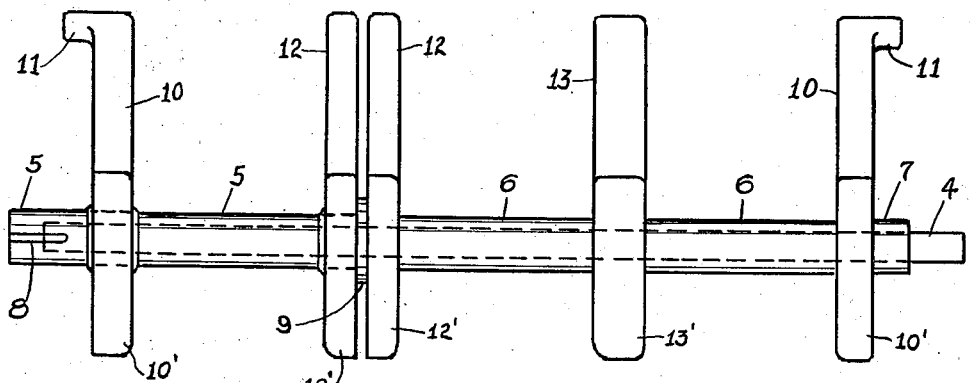
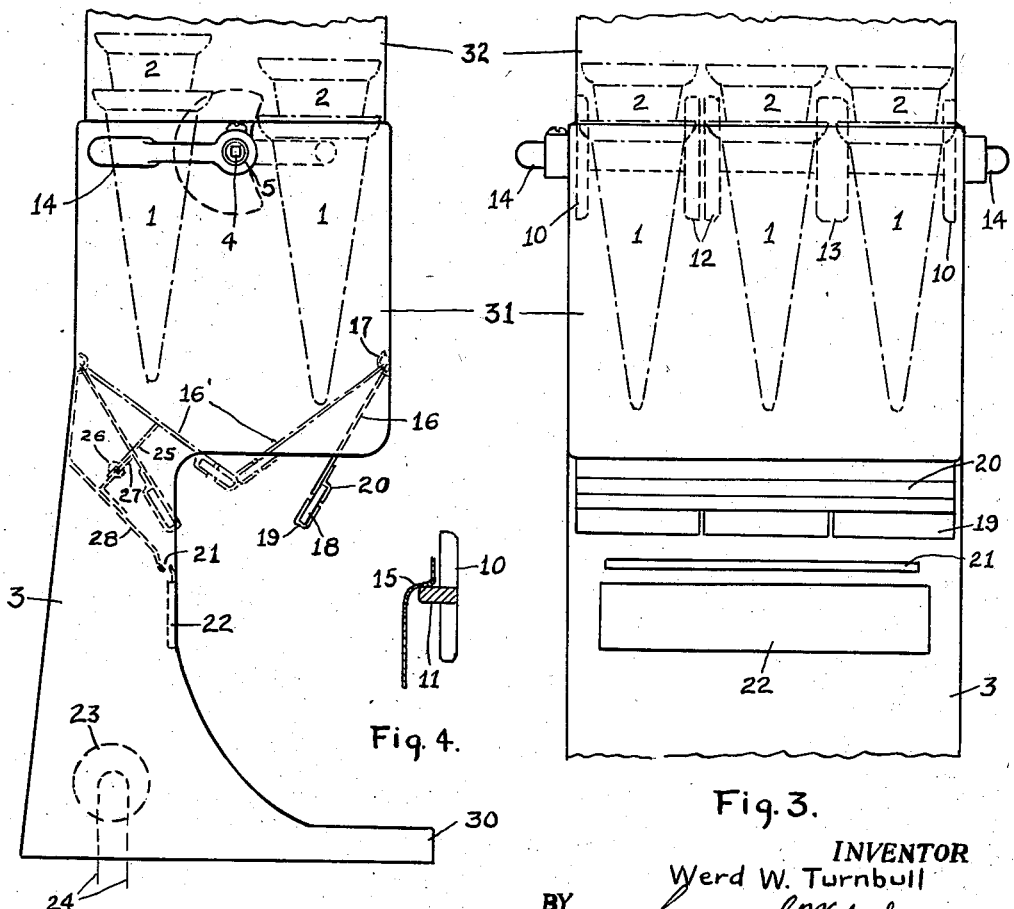
Fig. 1.
Fig. 2.
Fig. 4.
Fig. 3.
INVENTOR
Werd W. Turnbull
BY Carmack Waterhouse
ATTORNEY Patented June 23, 1942

2,287,206

UNITED STATES PATENT OFFICE 2,287,206

MULTIPLE CONE DISPENSER

Werd W. Turnbull, Chattanooga, Tenn.

Application August 26, 1940, Serial No. 354,234

4 Claims. (Cl. 312—44)

My invention relates to dispensers and more particularly to pastry cup or ice cream cone dispensers of the double acting type and is an improvement upon the dispenser set forth in the copending Turnbull applications, Serial Number 188,616 filed February 4, 1938, and issued as Patent No. 2,235,855 and Serial Number 250,379 filed January 11, 1939 respectively.

In the prior art, it has generally been the practice to keep ice cream cones in glass cases or counters near the fountain, in card board boxes, or in other containers or places for consumption. When so located they are often unprotected from moisture which causes them to become soggy, subject to contact with other objects resulting in injury or breakage, and are not quickly and readily obtainable when desired or needed and cannot be attractively displayed to the customer.

Where large volumes of ice cream cones are consumed, the space available is limited and the employees numerous, the problem of quickly and efficiently dispensing the cones and of merchandizing them in an attractive manner is a great one. A dispenser is the only satisfactory solution.

As indicated in Bereck 1,743,092, Horton 2,092,745, and Baker 1,704,695 and other patents of the prior art, some attempts have been made to meet these problems by providing a dispenser. However, in none of these cases was any satisfactory means provided for catching and holding the cones when released from the stack. Nor were any adequate safeguards provided against breakage, protection against moisture or means for keeping the cones crisp and fresh. Furthermore they were only adapted to dispense a single cone at a time and a complete cycle of operations was required for each cone released.

Applicant with a knowledge of all these defects in and objections to the prior art has for an object of his invention the provision of an ice cream cone dispenser which will make two releases of ice cream cones each cycle of operation.

Applicant has as another object of his invention the provision of an ice cream cone dispenser having yieldable means for catching and supporting ice cream cones after they are released at the outlet positioning them for ready accessibility.

Applicant has as another object of his invention the provision of an ice cream cone dispenser properly illuminated at its base and furnishing heat for keeping the cones dry and crisp from the lowermost cone in the stack to the uppermost cone.

Applicant has as another object of his invention the provision of an ice cream cone dispenser having means for closing it when not in use to effectively prevent the ingress of moisture thereto and to protect its contents from insects and rodents and the like.

Applicant has as a further object of his invention the provision of a dispenser for ice cream cones for dispensing either one or a plurality of cones from a single mounting.

Applicant has as a still further object of his invention the provision of means for preventing sticking of the cones to the supports after they are released from the stack.

Other objects and advantages of my invention will appear from the following specification and accompanying drawing and the novel features thereof will be particularly pointed out in the annexed claims.

In the drawing, Fig. 1 is a top plan view of the dispensing mechanism of my improved dispenser. Fig. 2 is a fragmental side elevation of my improved dispenser. Fig. 3 is a fragmental front elevation of the same dispenser. Fig. 4 is a detail showing my improved stop for limiting the movement of the dispensing mechanism.

Referring to the drawing in detail 3 designates a housing of pressed steel plate or other suitable material having a forwardly projecting portion 30 at its lower end providing a supporting base. Disposed within the lower portion of housing 3 and projecting transversely across it is an electric light 23 having leads running to a source of electrical energy. From the base 30 the housing converges upwardly to an enlarged portion providing a chamber for the cones, and from the lower end of which the cones are removed. Intermediate the base 30 and chamber 31 and disposed within an opening in the front face of housing 3 is a transparent or translucent element 22 for illuminating the lower portion of the dispenser, assisting the clerk in the removal of cones and presenting an attractive display.

Bridging the front and rear walls of the housing 3 above the element 22 and below the chamber 31, slanting upwardly and rearwardly and joined to said front and rear walls, is a plate 28. Pressed into and extending across the plate 28 adjacent the front wall thereof is a slot 21 for permitting warm convection currents to flow upwardly from the light into the cone chamber 31.

The upper end of the housing 3 terminates in a shoulder 15 which serves to join the housing 31 to the upstanding restricted cabinet portion 32. Mounted in the upper extremity of the housing 3 is a dispensing mechanism bridging the end walls of the housing and journaled therein.

The dispensing mechanism includes a shaft 4 of square or other non-circular cross-section which entirely spans the end walls of the housing 3 through the central part thereof. Non-rotatably mounted on the shaft 4 and spaced apart by spacers 6, 6, 7, 9 are a plurality of collars having radially projecting fingers 10, 12, 13 circumferentially spaced from ears, noses, or ribs $12^1$, $13^1$, $10^1$. These latter disc shaped elements are extended over almost a complete circle, only being broken to provide sufficient space for their respective spaced fingers. Also mounted on shaft 4 and rotatable thereon is a hub made up of spacer elements 5, 5 and collars including projecting fingers 10, 12 circumferentially spaced from noses or ears $10^1$, $12^1$. Formed on and projecting laterally outwardly in opposite directions from the ends of fingers 10, 10 are lugs or stops 11, 11. The shaft 4 projects beyond the spacer sleeve 7 at one end and the sleeve 5 of the hub projects on beyond the shaft 4 at the opposite end.

When mounted in the housing 3 a handle 14 is carried by one end of the dispensing mechanism directly upon the free end of shaft 4, and another handle is mounted on the free projecting portion of sleeve 5 and is brought into coaction with a longitudinal rib 8 pressed outwardly therefrom. Screws or other retention means may be employed to retain the handles in position.

The lower end of chamber 31 is closed by doors 16, 16 hinged to the front and rear walls of housing 3, said hinges 17, 17 being pressed inwardly from the walls of the housing. The free ends of the doors 16, 16 terminate in spaced channel shaped portions 20, 20 joined through resilient pieces 18, 18 to oppositely positioned channel elements 19, 19 which are adapted to engage each other in closed position, and to be retained in such position by support 25 pivoted to housing 3 by element 25.

In its operation the cabinet is filled with stacks of nested cones positioned on either side of shaft 4 and between sets of fingers and ears. The rotation of the right arm 14 through a semi-circle moves stop 11 out of engagement with shoulder 15 on one side of shaft 4 back into engagement with it on the other side thereof. The bottom cones 1, 1 are released by fingers 10, 13, 12 in the manner described in detail in the foregoing application, and the noses $12^1$, $13^1$, $10^1$ are brought into contact with and support those stacks through the next lower cones 2, 2 in said stacks. During this operation the doors 16, 16 are in the lower full line position, permitting the body of the cones 1, 1 to drop through the openings between the doors and rest upon the metal covered resilient elements 18, 18, and the covering 19, 19 prevents the cones from sticking thereto. In this position the bottoms of the cones rest upon the upper surface of the base 30 facilitating their easy removal by the clerk who merely pulls or twists on the cones to remove them. By having the elements 18, 18 independent and spaced apart, each cone may be removed by the clerk without effecting the others. As the handle is moved by in the opposite direction through a semi-circular path, cones from the stacks on the opposite sides of shaft 4 are released and drop through the doors 16, 16 in a similar manner. It is thus seen that in a single cycle the dispensing mechanism acts twice to release cones.

If on the other hand the clerk simply wishes to release a single cone on each operation, he uses the handle 14 on the left end of the dispenser. He moves it in a semi-circular path from one stop position to another, as heretofore described. This causes hub 8, 10, 5, 12 to rotate with respect to shaft 4, which remains stationary during this operation. The fingers 10, 12 move down, the lowermost cone 1 of the stack is released, the ears $10^1$, $12^1$ engage the next cone 2 of the stack and support it, and the fingers 10, 12 are brought upwardly to an engagement with the bottom cone of the opposite stack as it slides off of the rear of the ears $10^1$, $12^1$ in the manner previously described in detail in my prior applications heretofore referred to.

The cone 1 drops into the ends of doors 16, 16 and is removed therefrom in the manner heretofore described.

When the dispenser is not in actual use the doors 16, 16 are moved up into the dotted line position $16^1$, $16^1$, so that the end of the front door is under and in engagement with the rear door whereby the pivoted arm 25 may be brought up under it and support the doors in closed position.

When in open position heat from light 23 rises through slot 21 into chamber 31 and cabinet 32 where it serves to heat and render crisp the cones contained therein.

Having thus described my invention, I claim:

1. A pastry cup dispenser of the character described comprising a housing, having an opening adjacent its lower end, means disposed within said housing and positioned above said opening for supporting a stack of nested cones, means for successively releasing the lowermost cone from the stack to drop through said opening, and doors below said supporting means for engaging the tops of the cones passing through said opening when in open position for supporting them.

2. A pastry cup dispenser of the character described comprising a housing, means for dispensing cones from a stack in said housing, and means positioned below said dispensing means for catching and supporting said cones, said means including spaced resilient elements carried by the free ends of hingedly mounted doors and a covering on the surfaces of said resilient elements to prevent sticking.

3. A pastry cup dispenser of the character described comprising a housing, means carried by the housing and passing centrally therethrough for supporting stacks of nested cones on each side thereof, and means for alternately releasing the lowermost cones from stacks on each side thereof.

4. A pastry cup dispenser of the character described comprising a housing, means carried by said housing and extending substantially centrally therethrough for supporting stacks of nested cones, on opposite sides thereof, and movable means for dispensing cones from said stacks, said movable means dispensing cones from the stacks on one side of said supporting means during one half of the cycle of movement and cones from the other stacks during the other half of the cycle of movement.

WERD W. TURNBULL.